United States Patent
Agha et al.

(10) Patent No.: US 6,769,851 B2
(45) Date of Patent: Aug. 3, 2004

(54) CAPTIVE FASTENER

(75) Inventors: Henna Agha, Hoffman Estates, IL (US); Frank Bondarowicz, Park Ridge, IL (US); Glenn G. Heavens, Cheshire, CT (US); Amy L. Williams, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/321,754

(22) Filed: Dec. 17, 2002

(65) Prior Publication Data

US 2003/0108402 A1 Jun. 12, 2003

Related U.S. Application Data

(63) Continuation-in-part of application No. 10/016,374, filed on Dec. 10, 2001, now Pat. No. 6,688,826.

(51) Int. Cl.[7] .............................................. F16B 21/18
(52) U.S. Cl. ....................... 411/353; 411/999; 411/161; 411/526
(58) Field of Search ................................. 411/520, 525, 411/526, 352, 353, 107, 999, 155, 160, 161, 163, 544, 534

(56) References Cited

U.S. PATENT DOCUMENTS

| | | |
|---|---|---|
| 772,079 A | 10/1904 | Ball |
| 1,715,777 A | 6/1929 | Olson |
| 1,926,917 A | 9/1933 | Rosenberg |
| 2,709,470 A | 5/1955 | Knohl |
| 3,156,281 A | 11/1964 | Demi |
| 4,892,000 A | 1/1990 | Renk |
| 5,645,282 A | 7/1997 | Belter |
| 6,309,157 B1 | 10/2001 | Amann et al. |
| 6,379,093 B1 | 4/2002 | Bondarowicz |

*Primary Examiner*—Flemming Saether
(74) *Attorney, Agent, or Firm*—Mark W. Croll; Paul F. Donovan

(57) ABSTRACT

A captive fastener retention member includes a cylindrical body having a flange at one end thereof. Work piece retention members project outwardly of the body for securing the retention member in a bore of a work piece. A dimple projects inwardly in the retention member to hold a fastener. The flange on the retention member rests against a work piece, and is shaped to inhibit scratching or gouging of the work piece surface.

16 Claims, 3 Drawing Sheets

CAPTIVE FASTENER

CROSS REFERENCE TO RELATED APPLICATIONS

This is a continuation-in-part of U.S. patent application Ser. No. 10/016,374, entitled "Captive Fastener System and Retention Member", filed on Dec. 10, 2001, now U.S. Pat. No. 6,688,826.

FIELD OF THE INVENTION

The present invention generally relates to fastening systems, and, more particularly, to a pre-assembled fastening system having a fastener secured in a fastener retainer.

BACKGROUND OF THE INVENTION

The simple act of attaching one work piece to another using a threaded fastener in an assembly process, while simple to perform, can have a significant impact on overall assembly process efficiency. In the simple form of such an assembly operation, a bolt or the like is inserted through a hole in a first work piece, and is engaged in threads in a hole of a second work piece. When performed repetitively in an assembly process, seemingly small improvements in each such operation can have a significant overall effect.

It is known to provide fasteners in a grommet-like device that can be inserted and held in the hole of the first work piece. In this way, the first work piece with fastener can be pre-assembled, and when joined with the second work piece during the assembly process, the fastener is already in place for attaching the first and second work pieces together. Holding fasteners in fastener retainers held in one work piece also has advantages in assemblies that are disassembled occasionally or routinely. Fasteners are less likely to become lost, and re-assembly is simplified if the fasteners are held in position for reattachment.

Fasteners with fastener retainers, often referred to as captive fasteners, have taken on different forms, with differing results. U.S. Pat. No. 5,395,194 entitled "CONVOLUTED BOLT RETAINER", for example, discloses a polymer retainer having a thin wall body member comprising an arrangement of alternating ribs and ears about a central opening. The polymeric retainer is pre-assembled into a shaped bore in a structural member, and is retained therein by elastic deformation of the retainer walls. The elastic body member retains a bolt shaft disposed in the opening thereof, prior to mounting of the structural member on a mounting surface.

A disadvantage of this design, however, is that a special stepped bore is required in the structural member. As such, the retainer cannot be used with structures having conventional holes. An additional disadvantages is that fastener systems constructed in accordance with the design are not adequately retained in the structure, and can become dislodged during shipment.

Other captive fastening systems have fastener retention members that engage the threads of the fastener, such that the fastener must be more or less threaded into or out of the fastener retention member, to adjust the axial position of the fastener relative to the fastener retention member. The time required to secure the fastener in the retention member, or to adjust the relative position of the fastener in the retention member when final assembly is performed is lengthened in such systems.

Captive fastener systems having a cylindrical body received in a hole of one of the work pieces and an end flange to seat against a surface of the work piece also are known. A problem can occur if the flange scratches or gauges the surface of the work piece as the fastener is tightened, particularly if the surface of the work piece has a protective coating to inhibit corrosion of the work piece.

What is needed in the art is a fastener retention member of a captive fastener system that is retained securely in a hole of a work piece, without special shaping of the hole. It is further desirable that the fastener retention member grasp the fastener securely, at any position along the length of the fastener, whether at a threaded portion or at a smooth portion of the fastener shank, while still allowing axial adjustment of the fastener in the fastener retention member. Once seated in the hole, the fastener retention member should allow insertion or withdrawal of the fastener relative to the fastener retention member, without dislodging the fastener retention member. Further, it is desirable that the fastener retention members allow slight angular adjustment of the fastener within the hole in the work piece such that the captive fastener system compensates for slight misalignment between the first and second work pieces. Still further, it is desirable that the fastener retention member not spin relative to the work piece, and that scratching or gouging by the fastener retainer be minimized or eliminated.

SUMMARY OF THE INVENTION

The present invention provides a captive fastening system in which a shaped flange on a fastener retention member is provided to seat against a surface of a work piece without gouging or scratching the work piece. A fastener is held in the fastener retention member by an inwardly directed dimple that frictionally engages the outer surface of the fastener.

In one form thereof, the invention provides a captive fastener system with a fastener including a head and a shank, at least a portion of the shank having threads. A fastener retention member includes a cylindrical body having first and second ends and an axial opening between the first and second ends. A flange at one end of the cylindrical body extends radially outward from the axial opening. At least one work piece engagement member is adapted and arranged to engage a bore in a work piece. A single inwardly extending dimple in the cylindrical body frictionally engages the fastener shank. The dimple is of substantially hemispherical shape.

In another form thereof, the invention provides a fastener retention member with a cylindrical body having a first end and a second end, and an axial opening therethrough between the first end and the second end. The body includes a fastener retention member therein. A flange extends radially outwardly from the body, at one end of the body. The flange includes a plurality of flange segments each having flange segment ends. Adjacent segments are spaced from each other. The flange segment ends are angled in a direction away from the other of the ends of the body.

In still another form thereof, the invention provides a fastener retention member with a substantially cylindrical body having a first end and a second end, and an axial opening between the first end and the second end. The body is configured for holding a fastener therein. A flange extends outwardly of the body at one end thereof. The flange includes a plurality of flange segments each having flange segment ends. Adjacent segments are spaced from each other at the segment ends thereof. Each flange segment has a central region between the segment ends thereof, the central region being of arched configuration.

An advantage of the present invention is providing a captive fastener retention member that does not mar, scratch or gouge the surface of a work piece in which it is installed.

Another advantage of the present invention is providing a captive fastener system that adequately holds the fastener, but reduces the tendency for the retention member to rotate in the work piece.

Other features and advantages of the invention will become apparent to those skilled in the art upon review of the following detailed description, claims and drawings in which like numerals are used to designate like features.

Figure 1:
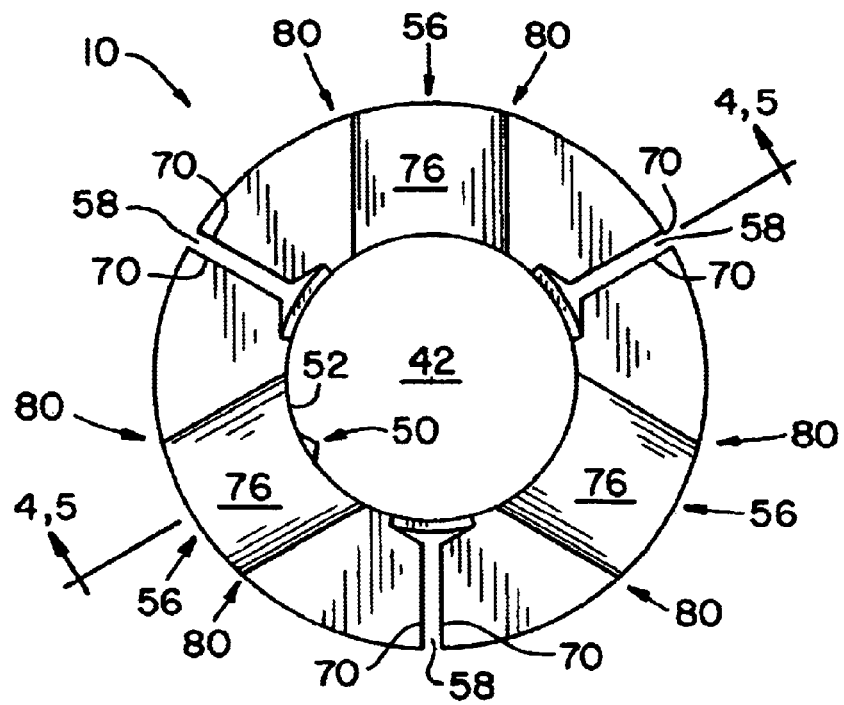
FIG. 1 is a plan view of a fastener retention member of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof as well as additional items and equivalents thereof.

DETAILED DESCRIPTION OF THE PREFERRED EMBODIMENT

Figure 2:
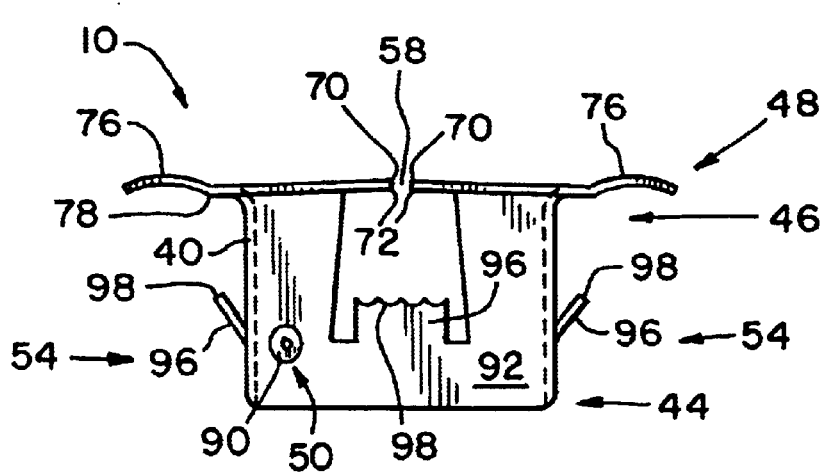
FIG. 2 is an elevational view from the side of the fastener retention member shown in FIG. 1.
Figure 3:
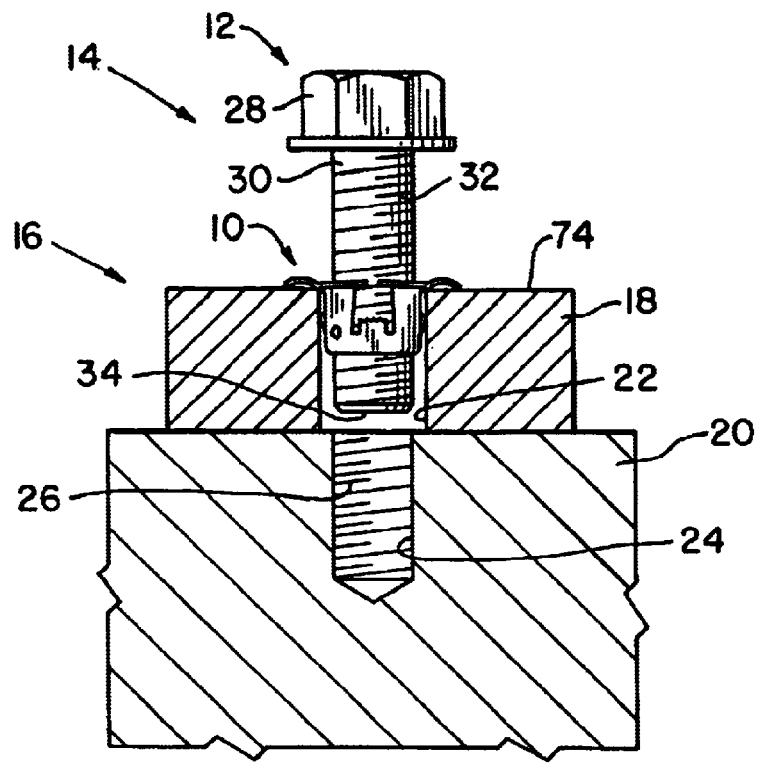
FIG. 3 is a cross-sectional view of a captive fastener system having a retention member of the present invention, shown prior to fastening work pieces together.
Figure 4:
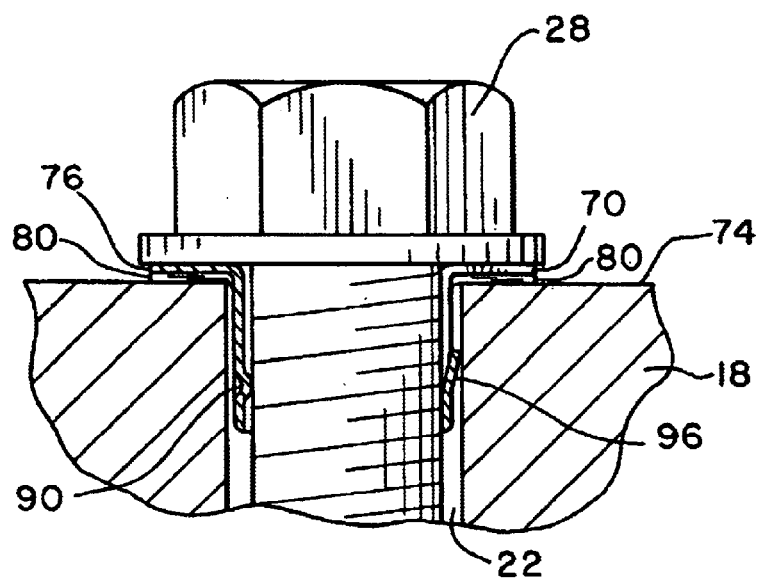
FIG. 4 is an enlarged cross-sectional view of the captive fastener system, taken along a line 4—4 through the retention member of FIG. 1.
Figure 5:
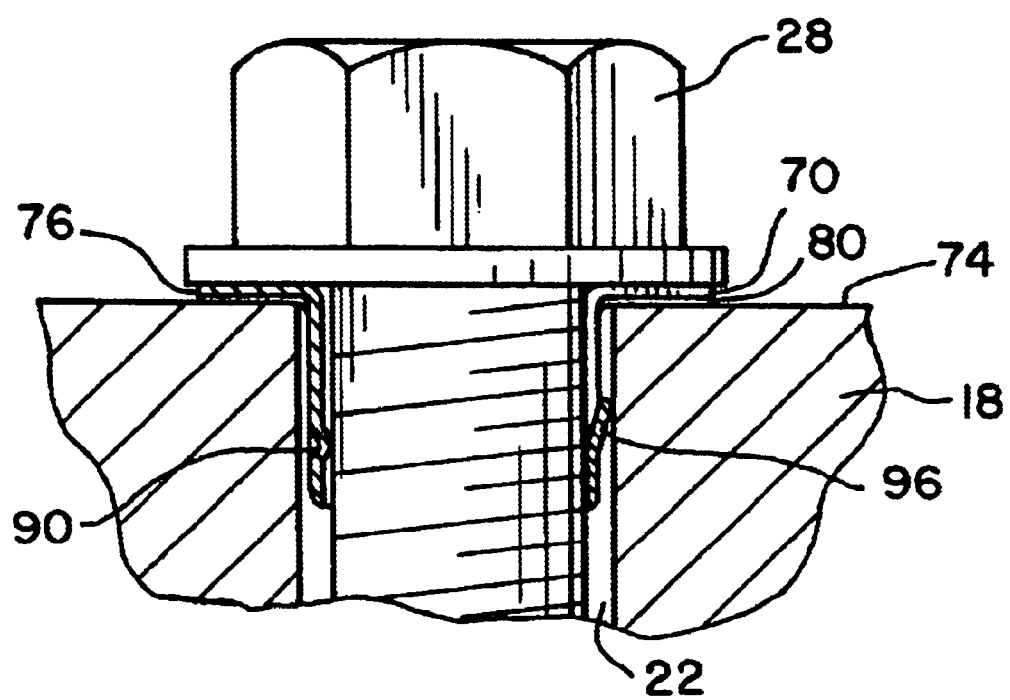
FIG. 5 is a cross-sectional view similar to that of FIG. 4, but illustrating the fastener in a further tightened condition from that shown in FIG. 4.

Referring now more specifically to the drawings, and to FIGS. 1 and 2 in particular, a fastener retention member 10 according to the present invention is illustrated. Fastener retention member 10 is used with a fastener 12 in a captive fastener system 14 (FIGS. 3–5). Fastener system 14 is useful in completing an assembly 16, in which a first work piece 18 and a second work piece 20 are fastened together. First work piece 18 includes a bore 22 for receiving fastener retention member 10, and second work piece 20 includes a bore 24 having threads 26 therein. First work piece 18, for example, may be an oil pan, valve cover or the like, and second work piece 20 an engine block.

Fastener 12 may be a bolt, screw or the like, and includes a head 28 and a shank 30. At least a portion of shank 30 includes threads 32, and, as illustrated in FIG. 3, substantially the entire length of shank 30 may include threads 32. Alternatively, a non-threaded portion (not shown) of shank 30 may be provided between head 28 and threads 32. Threads 32 of fastener 12 are adapted for engagement with threads 26 in bore 24. An entrance end 34 is provided on shank 30, opposite head 28, and may be variously shaped for positioning shank 30 in bore 24 for proper alignment and engagement of threads 32 with threads 26.

As illustrated in FIGS. 1 and 2, fastener retention member 10 includes a substantially cylindrical body 40 having an axial opening 42 extending therethrough, between a first end 44 and a second end 46 of cylindrical body 40. As used herein, "axial direction" shall refer generally to a direction between first end 44 and second end 46, and "circumferential direction" shall refer to a direction around body 40, substantially parallel to first and second ends 44 and 46. A flange 48 protrudes radially outwardly from one end of body 40, and is shown in the drawings at second end 46. A fastener engagement member 50 protrudes inwardly from an inner surface 52 of body 40, and at least one, and preferably a plurality of work piece engagement members 54 extend outwardly of body 40.

Flange 48 comprises a generally annular, somewhat platelike member extending radially outwardly of body 40, and, as illustrated most clearly in FIG. 1, flange 48 comprises a plurality of discrete flange segments 56 extending radially outwardly of body 40 and separated by spaces 58. The diameter of flange 48 is greater than the diameter of bore 22, such that flange 48 prevents fastener retention member 10 from entirely entering into bore 22. Preferably, flange 48 is sufficiently large so as to support fastener retention member 10 on first work piece 18, while allowing some limited axial shifting of body 40 in bore 22. Flange 48 also serves as a mounting surface for head 28 of fastener 12 in a similar nature to a washer, when fastener 12 is fully tightened in threads 26.

Each flange segment 56 has two flange segment ends 70, with adjacent flange segment ends 70 from adjacent flange segments 56 defining space 58 therebetween. Each flange segment end 70 has a bottom edge 72 nearest a surface 74 of first work piece 18. As fastener 12 is tightened in threads 26, and head 28 frictionally engages flange 48, continued rotation of fastener 12 could cause bottom edges 72 to slide against surface 74. The sliding action of bottom edges 72 against surface 74 could create scratches, gouges and other surface breaches, which would become sites for promoted corrosion of first work piece 18. The present invention reduces the potential for scratching, gouging and the like by elevating edges 72 off surface 74.

Flange segments 56 are formed with a wavy configuration in which a central region 76 thereof is curved away from surface 74 when retention member 10 is installed in first work piece 18. Each central region 76 is a domed or arched shape toward head 28. A bottom surface 78 of each flange segment 56 has two smooth transition areas 80 adjacent central region 76, on opposite sides thereof. Even if retention member 10 is twisted in first work piece 18 as fastener 12 is tightened, transition areas 80 slide smoothly against surface 74, without scratching or gouging surface 74.

From each transition area 80, flange segments 56 angle away from surface 74, such that edges 72 of ends 70 are spaced from surface 74 before fastener 12 is fully tightened. Even if retention member 10 is caused to rotate in first work piece 18, bottom edges 72 are held away from surface 74 and will not ride against surface 74. As fastener 12 is tightened in second work piece 20, flange segments 56 are compressed between head 28 of fastener 12 and surface 74 of first work piece 18. Central regions 56 are flattened, and ends 70 are pushed downwardly toward surface 74. At such time as bottom edges 72 first engage surface 74, flange segments 56 are snuggly pinched between head 28 and surface 74, with no significant rotation.

Fastener engagement member 50 is a dimple 90 directed inwardly in body 40, into axial opening 42. In the illustrated embodiment, dimple 90 is a substantially hemispherical region formed in body 40, which occurs as a slightly elevated land on inner surface 52, and may appear as a depression in an outer surface 92 of body 40. Only one such dimple 90 is required to retain fastener 12 in retention member 10; however, it should be readily understood that more dimple s 90 can be used. Dimple 90 is provided to reduce the diameter of axial opening 42, and frictionally engage shank 30 of fastener 12 with sufficient resistance to adequately secure fastener 12 in body 40. However, fastener 12 is not so tightly gripped by retention member 10 that rotation of fastener 12 readily causes rotation of retention member 10 in work piece 18.

A particularly suitable work piece engagement member 54 is illustrated in the drawings, which includes a plurality, and as shown three resilient work piece engagement tabs 96 protruding outwardly from body 40. Each tab 96 is a segment cut in body 40, and has a distal end 98 that is bent or tilted outwardly from axial opening 42. Prior to insertion of fastener retention member 10 into bore 22, the diameter of fastener retention member 10 measured at the outer tips of distal ends 98 is greater than the diameter of bore 22. Distal ends 98 comprise those portions of tab 96 closest to flange 48, and tabs 96 are integral with body 40 at ends thereof opposite to distal ends 98. Thus, body 40 can be inserted into bore 22 with minimal resistance, as tabs 96 are deflected inwardly. However, withdrawal of body 40 from bore 22 is inhibited by distal ends 98 of tabs 96 engaging with the wall of bore 22.

In the use of fastener system 14, in accordance with the present invention, fastener 12 and fastener retention member 10 may be pre-assembled before placement of fastener retention member 10 in bore 22 of first work piece 18. Alternatively, fastener retention member 10 may first be installed in bore 22 of first work piece 18, with fastener 12 subsequently inserted in fastener retention member 10.

Fastener retention member 10, with or without fastener 12 positioned therein, is inserted into bore 22, with first end 44 first entering bore 22. As tabs 96 encounter bore 22, the tabs are deflected inwardly, allowing body 40 to enter bore 22 until transition areas 80 of flange segments 56 are seated on surface 74 of work piece 18. Bottom edges 72 of flange segment ends 70 are held above surface 74. Fastener retention member 10 is securely held in bore 22 by tabs 96, and specifically by distal ends 98 of tabs 96 engaging with bore 22. Distal ends 98 can be formed with points or an aggressive edge to partially embed in bore 22.

Fastener 12 is installed in fastener retention member 10 by inserting shank 30 in axial opening 42, entering at second end 46, through flange 48. Fastener 12 can be pushed to any desired depth of installation, and is retained at the desired position by frictional engagement of dimple 90 against shank 30. Fastener 12 may be adjusted in axial position relative to fastener retention member 10 by pushing or pulling fastener 12. However, dimple 90 frictionally engages shank 30 with sufficient resistance to inhibit easy dislodgement of fastener 12. However, since dimple 90 frictionally engages the outer surface of shank 30, either at threads 32 or non-threaded portion (not shown), at a discrete, minimal region, fastener 12 can be pushed or pulled inwardly or outwardly relative to fastener retention member 10. Thus, axial movement of fastener 12 in fastener retention member 10 can be accomplished by applying sufficient axial force inwardly or outwardly on fastener 12, without requiring a rotational movement of fastener 12. In this manner, if need be, fastener 12 can be positioned at one axial position during shipment, and can be adjusted quickly and easily to another axial position prior to, or during assembly of first and second work pieces 18 and 20.

When first work piece 18 and second work piece 20 are brought together during an assembly process, bores 22 and 24 are substantially aligned. Fastener 12 can be pushed along fastener retention member 10 until entrance end 34 of shank 30 enters bore 24. If bores 22 and 24 are not in exact axial alignment, fastener retention member 10 can be shifted slightly in bore 22 until entrance end 34 is properly aligned to enter bore 24. Tabs 96 allow slight axial adjustment without releasing body 40 from bore 22. When properly aligned and positioned, fastener 12 is turned about its axis in normal threaded fastener manner, to secure together first work piece 18 and second work piece 20 in assembly 16.

The resistance to rotation of retention member 10 in first work piece 18 is greater then the resistance to rotation of fastener 12 in retention member 10. Thus, even as fastener 12 is tightened, or perhaps even over-tightened, retention member 10 does not rotate in first work piece 18, and scratches or gouges are not formed in surface 74.

If it becomes necessary to unsecure first work piece 18 from second work piece 20, fastener 12 is turned sufficiently to disengage threads 32 from threads 26. When completely disengaged from threads 26, fastener 12 remains secured in retention member 10, and will not be lost or dropped as first work piece 18 is separated from second work piece 20.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A captive fastener system, comprising:
   a fastener including a head and a shank, at least a portion of said shank having threads; and
   a fastener retention member including:
      a cylindrical body having first and second ends and an axial opening between said first and second ends;
      a flange at one end of said cylindrical body extending radially outward from said axial opening;
      at least one work piece engagement member adapted and arranged to engage a bore in a work piece; and
      a single inwardly extending dimple in said cylindrical body for frictionally engaging said fastener shank, said dimple being substantially hemispherical.

2. The captive fastener system of claim 1, said fastener retention member being metal.

3. The captive fastener system of claim 1, said flange having a plurality of flange segments each having flange segment ends, and said flange segments having a wavy profile with said flange segment ends being nearer to said fastener head than other regions of said segments.

4. The captive fastener system of claim 3, said flange segments having central regions arched toward said fastener head, transition areas adjacent each said central region, and ends extending from said transition areas curving in the direction of said head.

5. The captive fastener system of claim 1, said threads extending the length of said shank.

6. The captive fastener system of claim 1, said flange having a plurality of flange segments each having flange segment ends, adjacent said segments being spaced from each other, and said flange segment ends being curved toward said head.

7. The captive fastener system of claim 1, said annular body including tabs extending outwardly therefrom.

8. The captive fastener system of claim 7, said fastener retention member being metal.

9. The captive fastener system of claim 1, said flange having a plurality of flange segments each having flange segment ends, adjacent said segments being spaced from each other, and said flange segments having central regions arched toward said fastener head.

10. The captive fastener system of claim 9, said flange segment ends being angled toward said head.

11. A fastener retention member comprising:

a cylindrical body having a first end and a second end and an axial opening therethrough between said first end and said second end, said body including a fastener retention member therein; and a flange extending radially outwardly from said body at one end of said body, said flange including a plurality of flange segments each having flange segment ends, adjacent said segments being spaced from each other, and said flange segment ends being angled in a direction away from the other of said ends of said body, each said segment having a central region between said ends thereof, said central region being of arched configuration, and said arched configuration of said central region, and said angled direction of said ends projecting in a same direction.

12. The fastener retention member of claim 11, including at least one work piece engagement member extending outwardly of said body, said at least one work piece engagement member including an outwardly extending tab formed in said body.

13. The fastener retention member of claim 12, said member being metal.

14. The fastener retention member of claim 12, said body including an inwardly projecting dimple.

15. A fastener retention member comprising:

a substantially cylindrical body having a first end and a second end, and an axial opening between said first end and said second end, said body configured for holding a fastener therein, said body including a single inwardly directed, hemispherically shaped dimple;

a flange extending outwardly of said body at one said end thereof, said flange including a plurality of flange segments having a wavy configuration, said flange segments each having flange segment ends, adjacent said segments being spaced from each other at said segment ends thereof, and each said flange segment having a central region between said segment ends thereof, said central region being of arched configuration, and each flange segment further having a bottom surface including smooth transition areas adjacent the associated central region on opposite sides thereof.

16. The fastener retention member of claim 15, said flange segment ends being angled in a direction away from the other of said body first and second ends.

* * * * *